(12) United States Patent
Smith (10) Patent No.: US 8,196,993 B2
(45) Date of Patent: Jun. 12, 2012

(54) DRAG REDUCING DEFLECTOR

(75) Inventor: Jeffrey P. Smith, Prosper, TX (US)

(73) Assignee: PACCAR Inc, Bellevue, WA (US)

( * ) Notice: Subject to any disclaimer, the term of this patent is extended or adjusted under 35 U.S.C. 154(b) by 245 days.

(21) Appl. No.: 12/367,383

(22) Filed: Feb. 6, 2009

(65) Prior Publication Data

US 2010/0201152 A1    Aug. 12, 2010

(51) Int. Cl.
*B60J 1/00* (2006.01)
*B60J 1/12* (2006.01)
*B60J 1/14* (2006.01)

(52) U.S. Cl. .................................................. 296/180.3

(58) Field of Classification Search ..... 296/180.1–180.5
See application file for complete search history.

(56) References Cited

U.S. PATENT DOCUMENTS

| | | | |
|---|---|---|---|
| 4,433,865 A | 2/1984 | Crompton, Jr. | |
| 4,685,715 A | 8/1987 | Hardin | |
| 4,693,506 A | 9/1987 | Massengill | |
| 4,824,165 A | 4/1989 | Fry | |
| 4,904,015 A | 2/1990 | Haines | |
| 5,092,648 A | 3/1992 | Spears | |
| 5,522,637 A | 6/1996 | Spears | |
| 5,536,062 A | 7/1996 | Spears | |
| 5,595,419 A | 1/1997 | Spears | |
| 5,653,493 A | 8/1997 | Spears | |
| 5,876,088 A | 3/1999 | Spears | |
| 6,099,069 A | 8/2000 | Spears | |
| 6,174,025 B1* | 1/2001 | Henderson et al. | 296/217 |
| 6,185,489 B1* | 2/2001 | Strickler | 701/29 |
| 6,428,084 B1 | 8/2002 | Liss | |
| 6,600,974 B1* | 7/2003 | Traechtler | 701/1 |
| 6,846,035 B2 | 1/2005 | Wong | |
| 6,886,882 B2 | 5/2005 | Farlow | |
| 6,932,419 B1 | 8/2005 | McCullough | |
| 6,986,544 B2 | 1/2006 | Wood | |
| 7,318,620 B2 | 1/2008 | Wood | |
| 7,374,229 B1 | 5/2008 | Noll | |
| 7,712,822 B2* | 5/2010 | Pfaff | 296/180.2 |
| 2002/0152009 A1* | 10/2002 | Bartoli | 701/29 |
| 2006/0049666 A1* | 3/2006 | Browne et al. | 296/180.5 |
| 2006/0103167 A1* | 5/2006 | Wong et al. | 296/180.1 |
| 2007/0200390 A1 | 8/2007 | Lotarev | |
| 2008/0267762 A1* | 10/2008 | Jain et al. | 415/2.1 |
| 2008/0309121 A1* | 12/2008 | Campbell | 296/180.1 |
| 2009/0125182 A1* | 5/2009 | Hoetzer et al. | 701/36 |

* cited by examiner

*Primary Examiner* — Glenn Dayoan
*Assistant Examiner* — Sunsurraye Westbrook
(74) *Attorney, Agent, or Firm* — Christensen O'Connor Johnson Kindness PLLC (57) ABSTRACT

One or more drag reducing deflector systems provide aerodynamic drag reduction during crosswind flow (CF) conditions including zero crosswind flow conditions. Embodiments of the drag reducing deflector system may also be utilized to assist braking of a vehicle.

13 Claims, 7 Drawing Sheets

DRAG REDUCING DEFLECTOR

BACKGROUND

Numerous means have been sought to improve the fuel-efficiency of moving bodies, and especially moving bluff bodies, by reducing their aerodynamic drag. In the field of surface transportation, and particularly in the long-haul trucking industry, even small improvements in fuel efficiency can reduce annual operating costs significantly. It is therefore advantageous in the design of a vehicle to reduce drag forces, thereby increasing the aerodynamic properties and efficiency of the vehicle.

The over-the-highway cargo hauling tractor-trailer combination is one vehicle that experiences excessive aerodynamic drag. Generally described, tractor-trailer combinations typically include a tractor having a so-called fifth wheel by which a box-like semi-trailer may be articulatedly attached to the tractor for transportation of the semi-trailer. By providing the articulated connection via the fifth wheel, a space or gap is formed between the aft facing rear wall of the tractor cab and the forward facing front wall of the semi-trailer. It is well known that this gap, or the gap between succeeding trailers (not shown) of a tractor trailer combination causes wake regions and, as a result, aerodynamic drag.

Previous investigations of aerodynamic drag of tractor-trailer combinations resulted in widespread adoption of fixed air deflectors mounted on the roofs of tractor cabs and/or trailer bodies, and wholly redesigned tractors that utilize aerodynamic fairings to gradually increase the relatively small frontal area of the tractors to match, and to blend smoothly with, the larger cross-section of typical trailers, in an attempt to deflect air efficiently across the gap between cab assemblies and trailer bodies. Current fixed air deflectors and fairings help guide frontal airstreams around the front of tractor-trailer combinations and/or smooth the air flow over the gap between the articulated bodies, thereby reducing aerodynamic drag and improving fuel efficiency.

While in some instances these systems reduce the effective gap between bodies, such gap reduction is incidental, often resulting in a significant amount of drag caused by the gap. Thus, aerodynamic drag reduction across the air gap between adjacent articulated tractor-trailer combination bodies is only partially achieved by fixed fairings and deflectors. Additionally, these roof mounted air deflectors and tractor fairings may help to reduce the aerodynamic drag in zero cross wind flow conditions, but these devices do not provide significant drag reduction when crosswind flow is present.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present invention, a side deflector assembly is provided for selectively manipulating an aerodynamic drag of a vehicle having a lead body, a trailing body, and a gap formed therebetween. The side deflector assembly includes first and second side deflectors movable between a retracted position in which the side deflectors are substantially aligned with the sides of the vehicle, and an extended position in which the side deflectors extend outwardly from the side of the vehicle at a selected angle. The assembly also includes a control system associated with the first and second side deflectors and adapted to independently position the first and second side deflectors between the retracted position and the extended position, wherein the control system senses the direction of a cross wind relative to the vehicle and effects articulation of one of the side deflectors to its extended position in response to the sensed crosswind.

In accordance with another aspect of the present invention, a side panel assembly is provided for selectively manipulating an aerodynamic drag of a vehicle having a lead body, a trailing body, and a gap formed therebetween. The side panel assembly includes first and second side deflectors movable between a retracted position in which the side deflectors are substantially aligned with the sides of the vehicle, an extended position in which the side deflectors extend outwardly from the side of the vehicle at a selected angle, and a braking position in which the side deflectors are at least partially disposed into the airstream passing along the side of the vehicle to increase a drag coefficient of the vehicle. The assembly also includes a control system associated with the first and second side deflectors and adapted to selectively and independently position the first and second side deflectors between the retracted position, the extended position, and the braking position. In one embodiment, the control system includes at least one cross wind sensor that senses the direction of a cross wind relative to the vehicle, and a controller for effecting asymmetrically articulation of one of the first and second side deflectors to its extended position in response to the sensed crosswind.

In accordance with another aspect of the present invention, a method is provided for manipulating the aerodynamic drag on a vehicle in a cross wind condition. The vehicle has first and second side deflectors movable to an extended position. The method includes sensing a cross wind condition, and in response to the sensed cross wind, deploying one of the first and second side deflectors to the extended position. In one embodiment, the extended side deflector is on the windward side of the vehicle.

DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Embodiments of the present invention will now be described with reference to the drawings where like numerals correspond to like elements. Embodiments of the present invention are directed to systems and methods for reducing the aerodynamic drag on vehicles, such as tractor-trailer combinations. Specifically, embodiments of the present invention are directed to systems and methods that reduce aerodynamic drag on vehicles in cross wind conditions. Although embodiments of the present invention will be described with reference to tractor-trailer combinations, one skilled in the relevant art will appreciate that the systems and methods of the present invention have wide application, and may be used in any situation where a reduction in the drag forces on a bluff body in cross-wind conditions is desirable. Accordingly, the following descriptions and illustrations herein should be considered illustrative in nature, and not limiting the scope of the present invention, as claimed.

Figure 1:
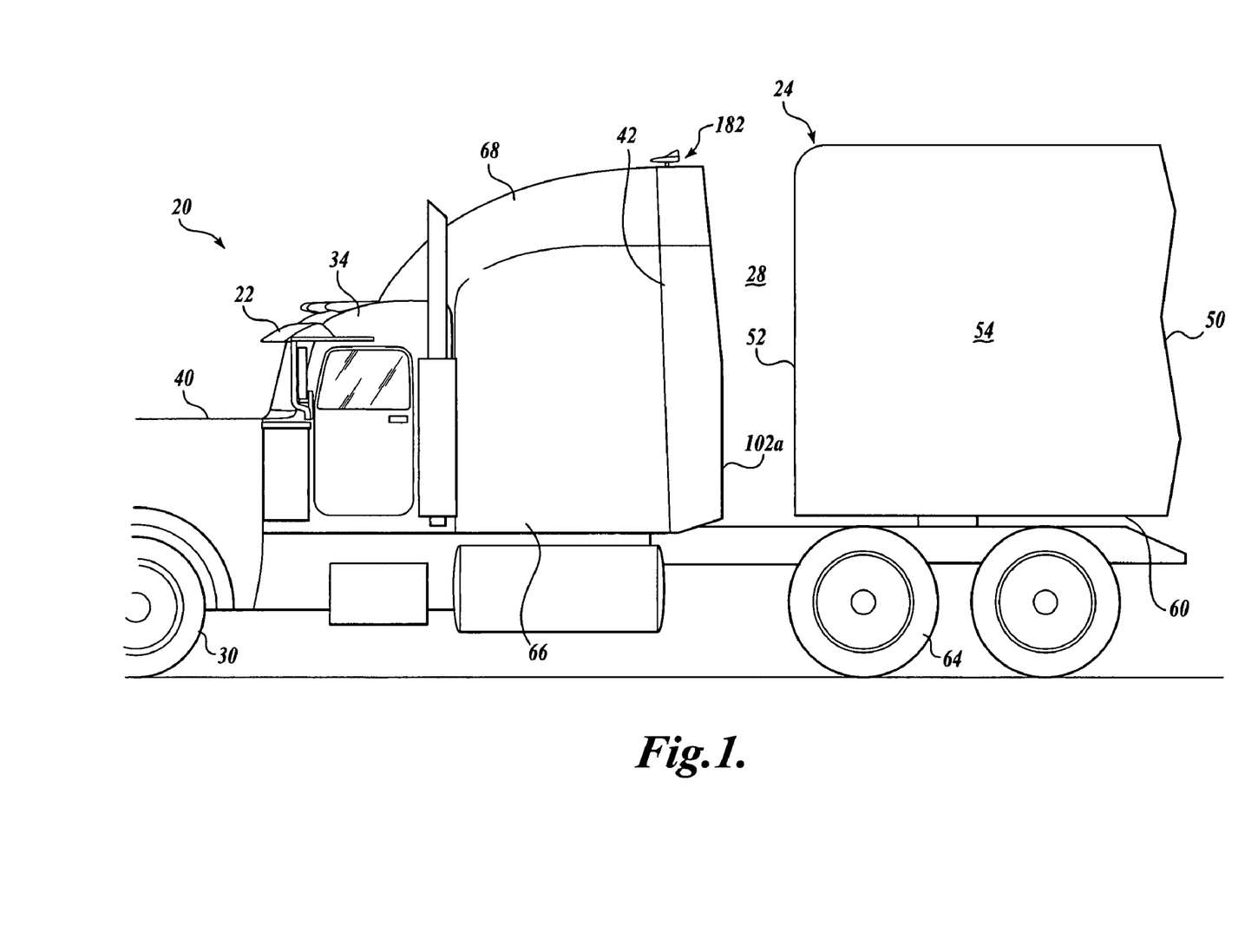
FIG. 1 is a side view of vehicle, such as a tractor-trailer combination, incorporating one embodiment of a drag reducing detector system in accordance with aspects of the present invention.
Figure 2:
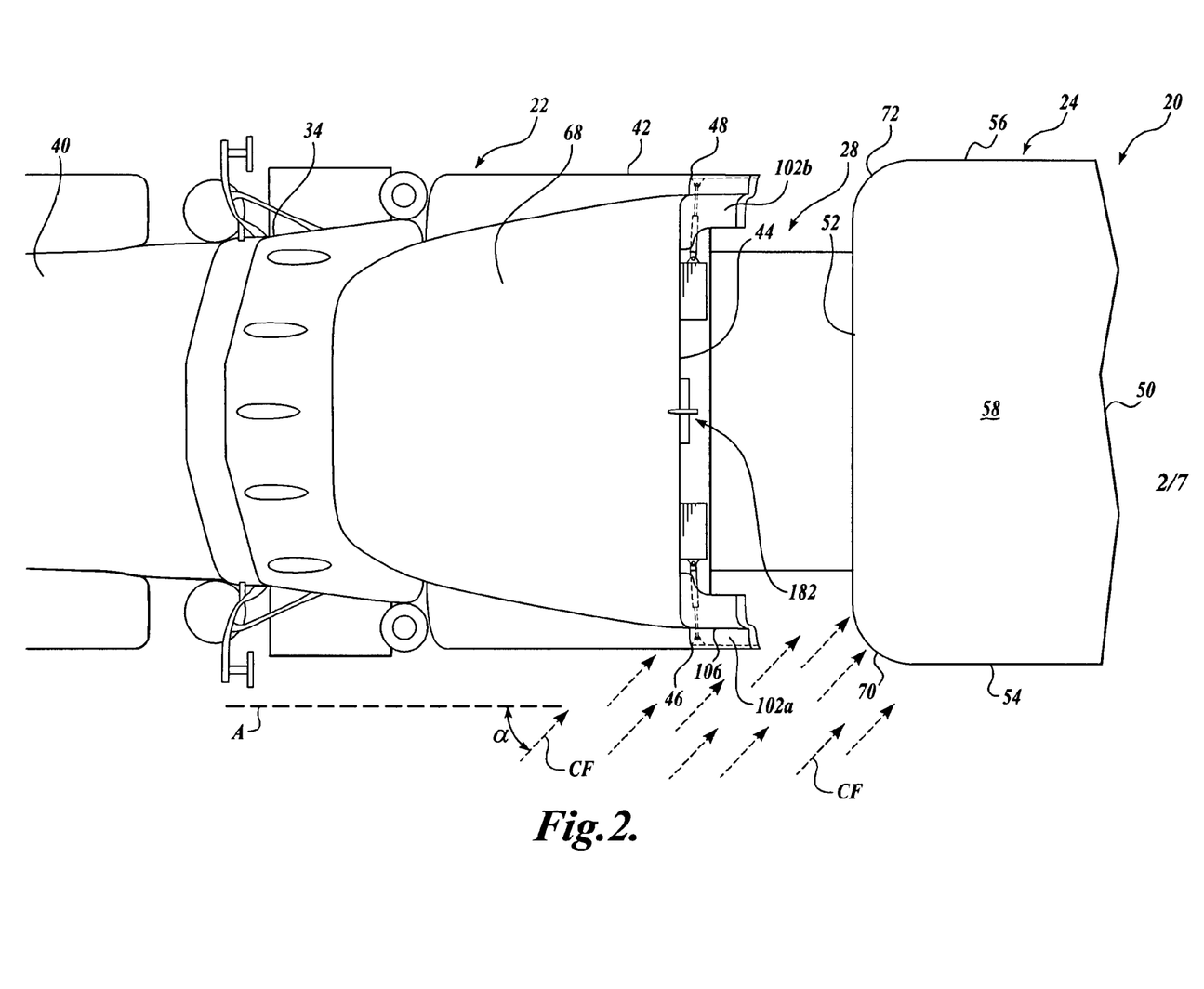
FIG. 2 is a top view of the vehicle shown in FIG. 1.

Turning now to FIGS. 1 and 2, there is shown one exemplary vehicle in the form of a tractor-trailer combination 20 incorporating one embodiment of a drag reducing deflector system 100 (see FIG. 5) formed in accordance with aspects of the present invention. The system 100 or any combination of components hereinafter described may be installed on new vehicles, such as combination 20, or may be retrofitted on existing vehicles, such as combination 20. The drag reducing deflector system 100 provides aerodynamic drag reduction during crosswind flow (CF) (see FIG. 2) conditions including zero crosswind flow conditions in which the crosswind flow angle, α, is 0.0. The crosswind flow angle α is measured from the vehicle longitudinal axis A that also defines the vehicle direction of motion. Embodiments of the drag reducing deflector system 100 may also be utilized to assist braking of the vehicle, such as the combination 20, as will be described in more detail below.

As best shown in FIGS. 1 and 2, the tractor-trailer combination 20 comprises a tractor 22 articulatedly connected to a trailer 24 by a so-called fifth wheel (not shown), the connection therebetween forming a space or gap 28. The tractor 22 comprises a chassis that is supported by wheels 30 connected thereto via conventional suspension assemblies (not shown). A conventional cab assembly 34 is supportably mounted on the chassis. The cab assembly 34 includes a front end 40 that generally houses an internal combustion engine that propels the combination and a rear end 42 that defines a generally vertically oriented rear wall 44 and left and right vertical trailing edges 46 and 48 (see FIG. 2). The trailer 24 includes a trailer body 50 that is generally rectangular in shape having a front wall 52, left and right side walls 54 and 56, a top wall 58, a bottom wall 60, and a rear wall (not shown). The trailer body 50 is supportably mounted on sets of wheel assemblies 64.

In the embodiment shown, the cab assembly 34 may include a sleeper box 66 and various roof fairings 68 if desired, but not required to appreciate the benefits of the present invention. Collectively, however, these structures are referred to herein as the cab assembly or cab 34. It will be understood, however, that a myriad of possible combinations and cab shapes can comprise the cab assembly. As is known in the art, the tractor 22 may include fairings or cowls (not shown) mounted to the front end 40 of the cab assembly 34 for improving the aerodynamics of the tractor 22, if desired. While the tractor 22 is shown as a conventional type tractor, aspects of the present invention work equally well with cab over engine (COE) type tractor configurations.

Still referring to FIGS. 1 and 2, the drag reducing deflector system, which permits the selective manipulation of the aerodynamic drag of the vehicle 20, will now be described in more detail. The drag reducing deflector system includes left and right side deflectors 102a and 102b. In the following description, the elements associated with the left and right side deflectors 102a and 102b are mirror images of one another. Therefore, where context permits, reference in the following description to an elements associated with one of the left or right side deflectors 102a or 102b shall also be understood as also referring to the corresponding elements in the other. A numbering scheme is used in which a suffix of "a" or "b" may be added to a reference numeral to designate a component associated with the left or right side deflector 102a or 102b, respectively, or the suffix may be omitted to refer to both simultaneously.

The side deflectors 102a and 102b are disposed along a side of the vehicle 20 in the gap 28. The side deflectors 102 may be utilized in lieu of conventional fixed cab side fairings, or in addition to conventional fixed cab side fairings. The drag reducing deflector system further comprises a deflector control system 140 (see FIG. 5) that independently positions the left and/or right side deflectors in a selective manner between a retracted position, as shown in FIG. 3A, one of a plurality of extended positions, as shown in FIG. 3B, and a braking position, as shown in FIG. 4.

Figure 3A:
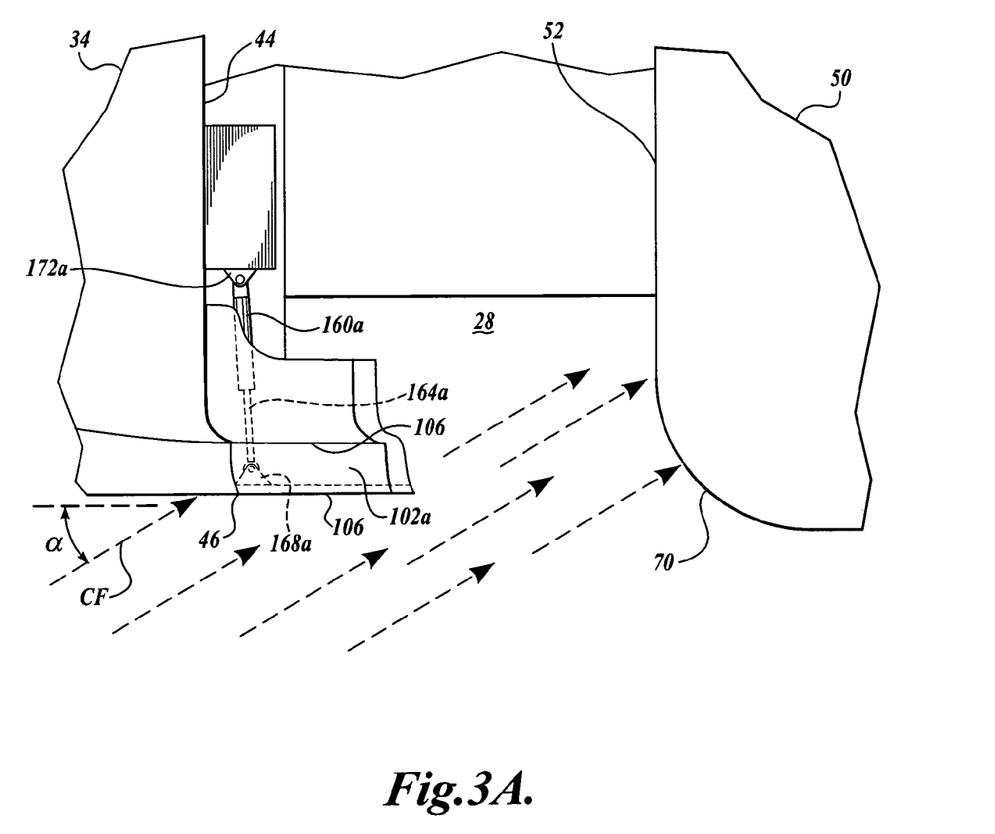
FIG. 3A is a magnified top view of the vehicle of FIG. 1, wherein a drag reducing deflector is in the retracted position.
Figure 3B:
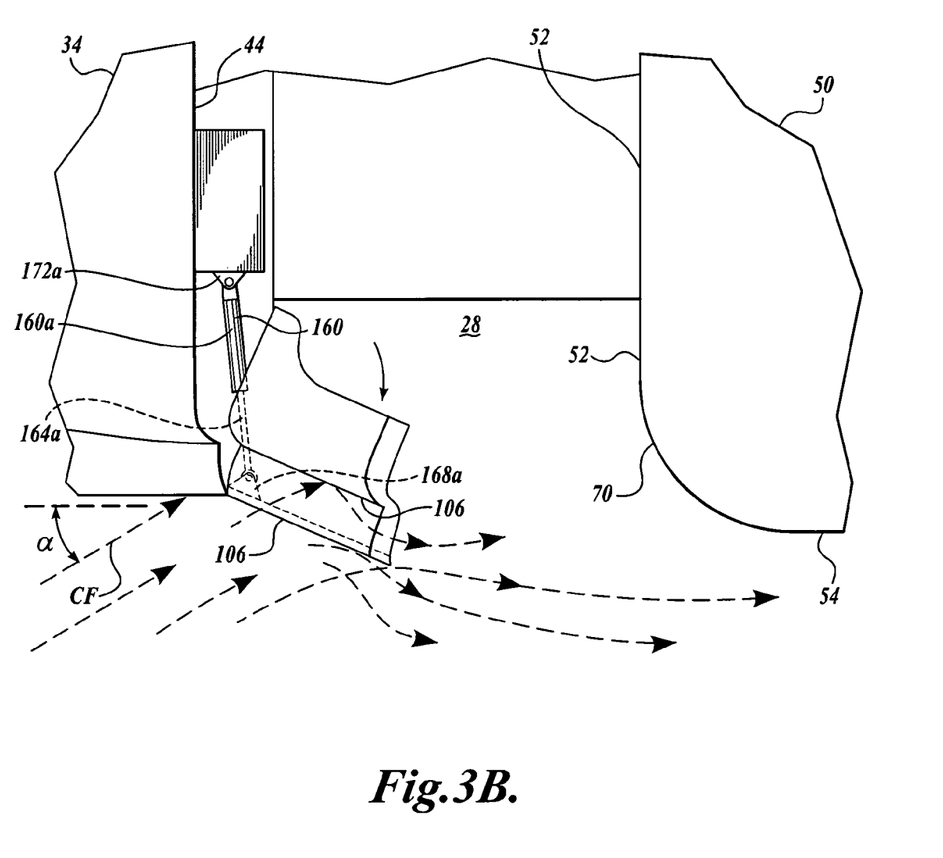
FIG. 3B is a magnified top view of the vehicle of FIG. 1, wherein a drag reducing deflector is in an extended position.
Figure 4:
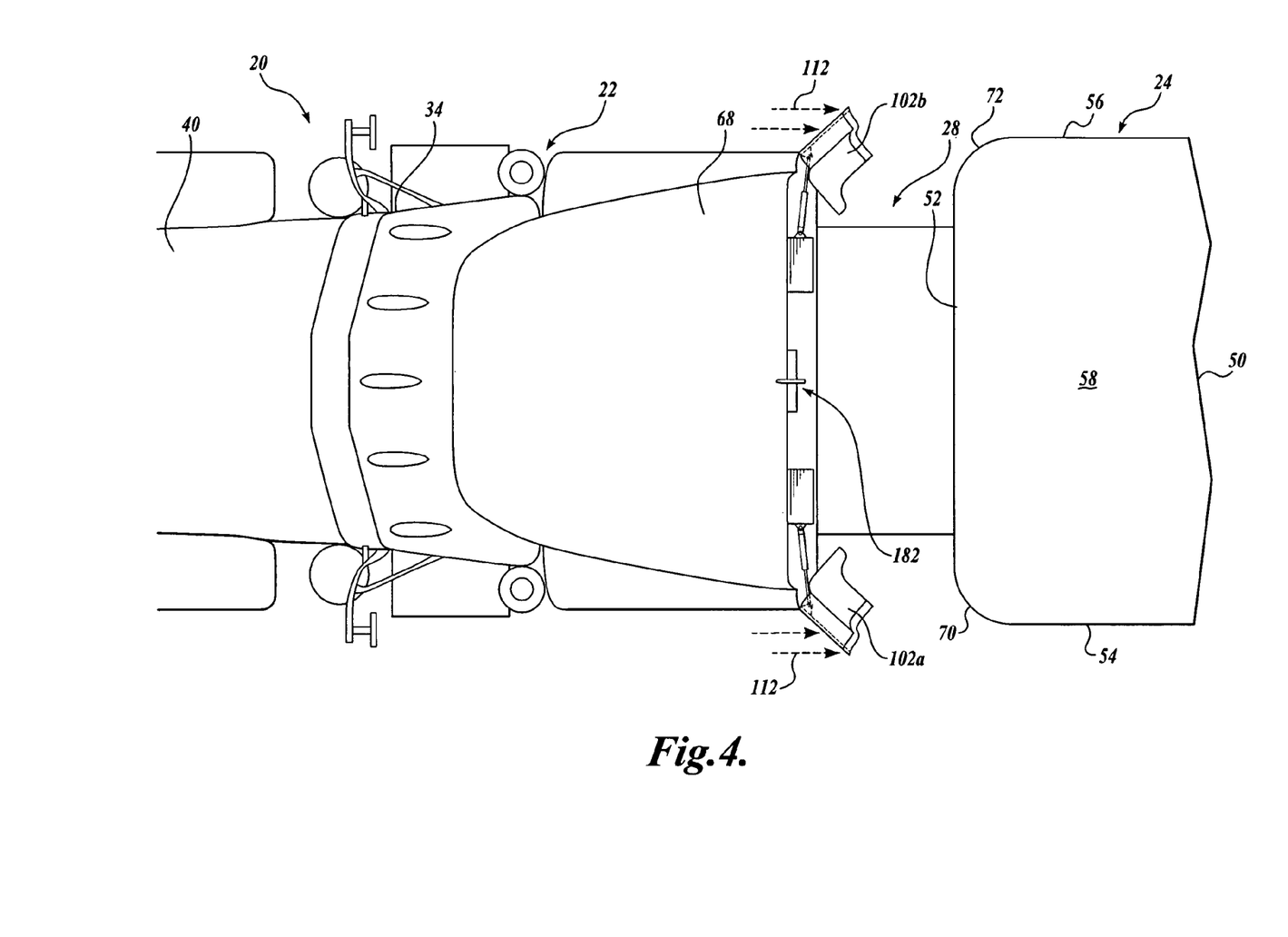
FIG. 4 is a top view of the vehicle of FIG. 1, wherein left and right drag reducing deflectors are both deployed in a "braking" position.

More specifically, during operation of the combination 20 in normal wind conditions, i.e., head winds that are aligned with the longitudinal axis A of the combination (i.e., α=0.0), the side deflectors 102a and 102b are positioned in the retracted position depicted in FIG. 3A so as to be substantially aligned with the sides of the vehicle. During cross wind conditions, where the crosswind flow angle is greater than zero (α>0), one of the side deflectors 102a or 102b, namely, the windward side deflector (shown as deflector 102a in FIG. 3B), is actuated into one of a plurality of extended positions, one being depicted in FIG. 3B, to increase the aerodynamic efficiency of the vehicle 20. As will be described in more detail below, the windward side deflector in one embodiment may extend at a selected angle that corresponds to the angle α of the cross wind flow CF to the vehicle. During a braking event, as shown in FIG. 4, irrespective of the wind condition, the side deflectors 102a and 102b are both actuated so that at least a portion of the side deflectors extend into the air stream 112 passing along the sides of the combination 20 to selectively decrease the aerodynamic efficiency of the combination 20, thereby assisting the braking system of the combination 20.

The detailed description will now focus upon exemplary components that may be utilized by the drag reducing deflector system. Referring to FIGS. 2 and 3A-3B, the side deflectors 102a and 102b are associated with the rear wall 44 of the tractor 22 so as to span a portion of the gap 28 extending along the sides of the combination 20 between the rear wall 44 of the tractor 22 and the front wall 52 of the trailer 24. In the embodiment shown, the side deflectors 102a and 102b are pivotally mounted to the cab assembly 34 in close proximity to the left and right rear vertically oriented trailing edges 46 and 48 via hinges (not shown in the FIGURES) or similar device. Hinges or similar devices preferably extend the length of side deflectors although multiple hinges or similar devices may be deployed in spaced relationship along such length. In the retracted position, the side deflectors 102a and 102b are aligned to direct at least a portion of the airstream passing along the sides of the tractor 22 to the sides of the trailer 24. To this end, an outer planar surface 106 of the side deflectors 102, also referred to as the control or conditioning surface, is oriented to direct a portion of the airstream towards the front corners 70 and 72 of the trailer 24 where the front wall 52 of the trailer 24 intersects the side walls 54 and 56, respectively.

Oriented as described, the side deflectors 102 are oriented substantially parallel with a longitudinal axis of the combination 20.

In the one or more extended positions, the side deflectors 102a and 102b are oriented to direct at least a portion of the cross wind flow CF to the sides of the trailer 24. To this end, the control surfaces 106 of the side deflectors 102 are positioned to direct a portion of the cross wind flow CF towards the front corners 70 and 72 of the trailer 24 where the front wall 52 of the trailer 24 intersects the side walls 54 and 56, respectively. Oriented as described, the control surfaces 106 of the deflectors 102 are oriented at a selected angle with respect to the longitudinal axis of the combination 20.

The side deflectors 102 are of a selected length chosen to permit the tractor 22 to pivot about the trailer 24 about its fifth wheel in a selected angular range without the front wall 52 of the trailer 24 contacting the side deflectors 102. The selected angular range is greater than about 45 degrees, and preferably over about 90 degrees. Ideally, the selected angular range is greater than about 180 degrees such that the tractor 22 may pivot 90 degrees to the left or right relative to the trailer without the trailer 24 impacting the side deflectors 102. The side deflectors 102 may be formed from any suitable rigid material, such as steel, aluminum, fiberglass, engineered plastic, etc. Preferably, the side deflectors 102 are thin panel-like members, having the selected length described above and a height substantially equal to the height of the tractor 22 and/or trailer 24. In an embodiment, the control surface 106 of the side reflectors matches the profile of the sleeper box 66 and roof fairings 68 so as to be substantially flush therewith. While shown as a unitary body, the side deflectors 102 may be composed of two or more panels.

Figure 5:
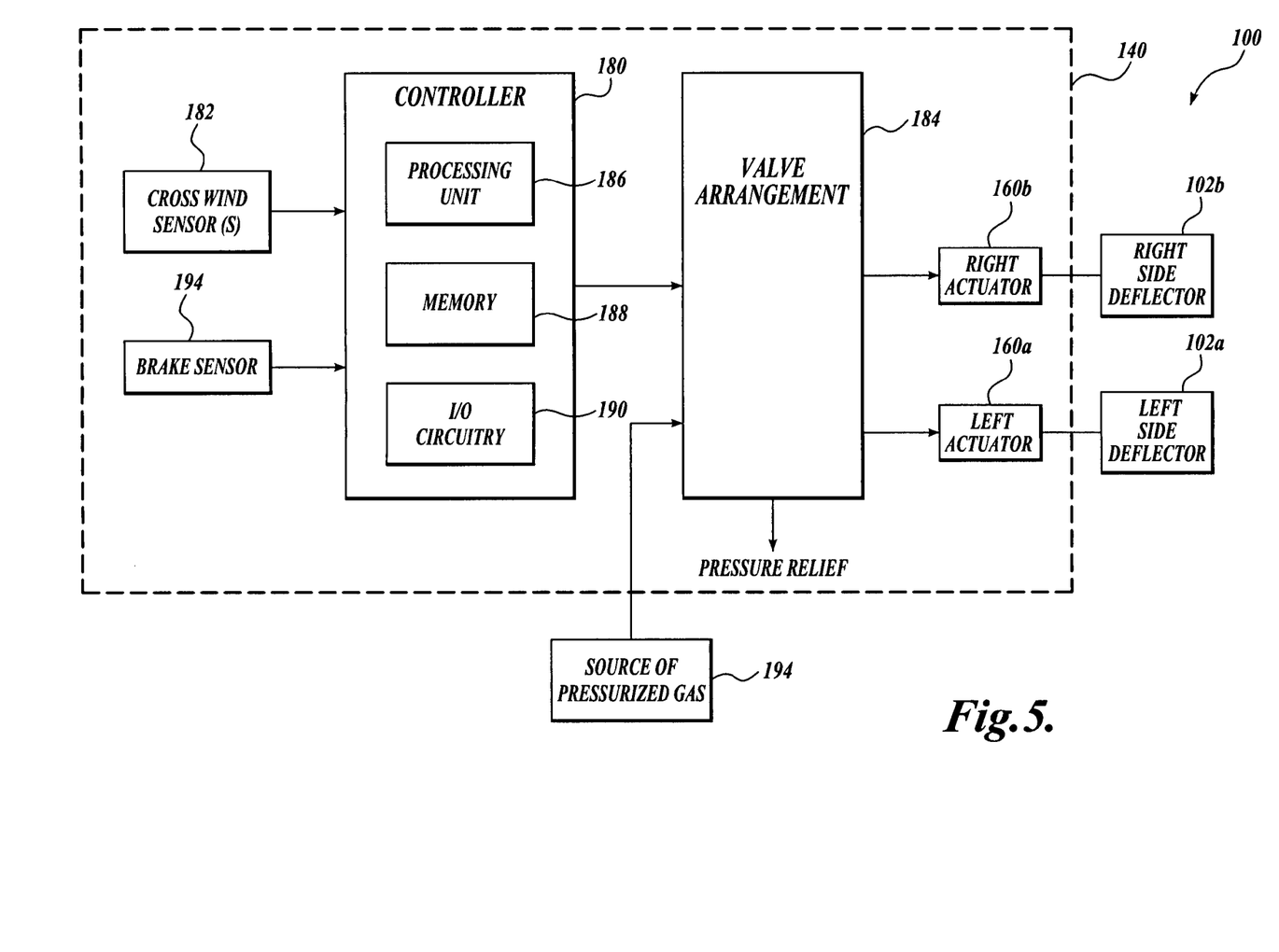
FIG. 5 is a block diagram of one exemplary embodiment of the drag reducing deflector system in accordance with aspects of the present invention.

Referring now to FIGS. 3 and 5, the drag reducing deflector system 100 further includes a control system 140 for selectively manipulating the side deflectors 102 between the retracted position and one or more selected extended positions. The control system 140 in one embodiment includes deployment actuators 160a and 160b associated with the left and right side deflector 102a and 102b, respectively. The deployment actuators 160 include linkages 164, the distal end of which is coupled in a suitable manner to the side deflectors 102 via attachment couplings 168. At the end opposite the attachment couplings 168, the deployment actuators 160 are supported by bracket or couplers 172, which are securely mounted, for example, to the cab assembly 34. In some applications, the connection interface with the brackets 172 allow the deployment actuators 160 to pivot or otherwise move in an appropriate manner as the side deflectors 102 articulate between the retracted position and the one of the plurality of extended positions.

In one embodiment, each deployment actuator 160 is a linear actuator that is configured to extend and retract the linkage 164. For example, in the embodiment illustrated in FIG. 3A, each deployment actuator 160 is a single or double acting pneumatic cylinder that utilizes air pressure supplied via a source of pressurized gas 194 (see FIG. 5) to reciprocate the linkage 164. By selectively extending/retracting the linkages 164, the side deflectors 102 may be selectively manipulated to any position between the retracted position depicted in FIG. 3 and the extended position show in FIG. 3b. In one embodiment, the rotation angle of the deflectors 102 ranges from zero degrees at the retracted position to about 10-20 degrees at the extended position.

Although a specific deployment actuator is described and depicted relative to the illustrated embodiment, it should be apparent to those skilled in the art that the side deflectors 102 may be reciprocated between the retracted and deployed positions by any suitable actuating means. For instance, the side deflectors 102 may be suitably actuated by any number of actuators now known or to be developed, such as magnetic actuators, hydraulic actuators, electromechanical actuators, rotational actuators, etc.

The actuators 160 are controlled by a controller 180 for selectively manipulating the side deflectors 102 between the retracted and one or more extended positions. As best shown in FIG. 5, the controller 180 is electrically connected (e.g., wired or wireless) to one or more cross wind sensors 182. The controller 180 receives signals indicative of cross wind conditions from the one or more cross wind sensors 182, and in response to receiving the signals from the sensors 182, the controller 180 is adapted to process such signals and selectively control the actuation of the deployment actuators 160, i.e., the extension/retraction of linkage 164. In one embodiment, the side deflector 102 at the windward side is actuated to a discrete position in the presence of a cross wind. In an alternative embodiment, the extended position is variable, and is dependent on the angle of the crosswind flow CF and sensed by the cross wind sensor 182.

In the exemplary embodiment of FIG. 5, the control system 140 includes a controllable valve arrangement 184, such as one or more solenoid actuated valves, for controlling the operation of the pneumatic cylinders. To that end, the valve arrangement 184 receives appropriate device specific control signals from the controller 180 for extending/retracting the linkage 164 of at least one of the actuators 160, which in turn, retracts/extends the side deflectors 102.

In order to receive the cross wind signals, process such signals, and generate the appropriate device specific control signals, the controller 180 may include a logic system for determining the operation of, for example, the valve arrangement 190, which may be distinct for each attended vehicle application. It will be appreciated by one skilled in the art that the logic may be implemented in a variety of configurations, including software, hardware (analog and/or digital), and/or combinations of software and hardware. In one embodiment, the controller 180 may include a processing unit 186, a memory 188, and input/output (I/O) circuitry 190 connected in a conventional manner. The memory 188 may include random access memory (RAM), read only memory (ROM), or any other type of digital data storage means. The I/O circuitry 190 may include conventional buffers, drivers, relays, etc., and the like, for sending the device appropriate signals to the valve arrangement 184.

In another embodiment, the controller 180 is coupled in electrical communication with a brake sensor 194. The brake sensor 194 is adapted to sense an application of the brakes by the operator and relay the sensed application of the brakes to the controller 180. Preferably, the brake sensor 180 ties into an existing data bus of the vehicle to obtain vehicle brake data. Alternately, the brake sensor 180 may be a separate brake sensor that is directly linked to the controller 180. In these embodiments, the system 140 would actuate both side deflectors 102a and 102b to a brake position shown in FIG. 4, when the brake sensors 194 senses that service brakes of the tractor 22 are applied so as to increase the amount of resistance (drag) against the forward motion of the tractor 22, thereby improving the braking ability of the tractor 22. It will be appreciated that other ways in which the system 140 may be controlled will readily be apparent to those skilled in the art and, accordingly, will not be described in any further detail.

Figure 6:
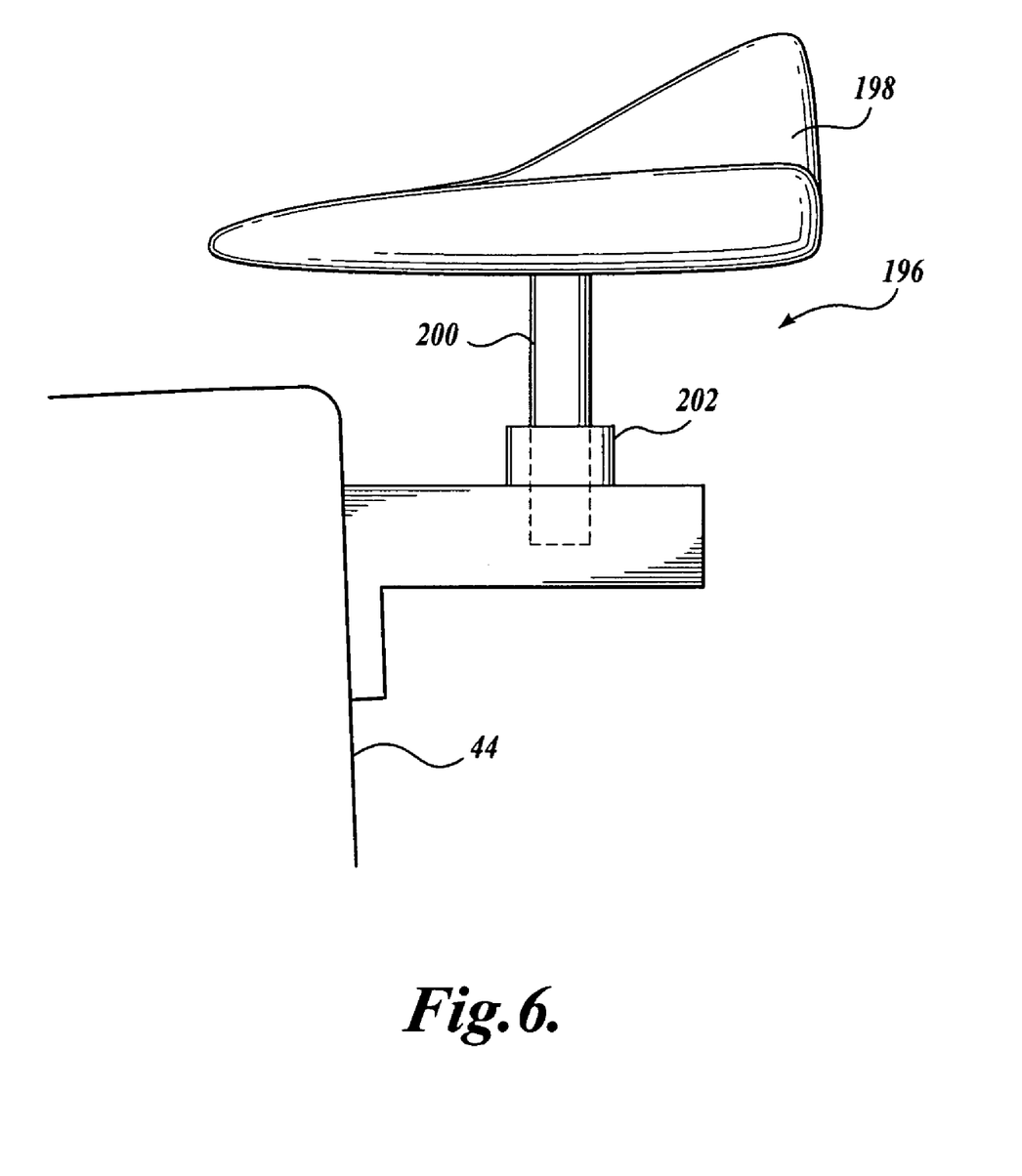
FIG. 6 is a schematic representation of one exemplary cross wind sensor formed in accordance with aspects of the present invention.

Referring now to FIGS. 6, one embodiment of an exemplary cross wind sensor 182 will be described in more detail. It will be appreciated that the cross wind sensor 182 may be any current or future developed sensor or device that generates signals indicative of the cross wind angle, α. In the embodiment of FIG. 6, an exemplary cross wind sensor 182 comprises a weathervane 196 having a plate-like head 198 attached to a shaft 200. The weathervane 196 is rotationally mounted to a portion of the combination 20, such as the rear wall 44 of the tractor, so that the head 198 is exposed to the crosswind flow CF. The cross wind sensor 182 further includes a rotary encoder 202 that measures the rotation or angular position of the shaft 198, and generates signals indicative of shaft angular position to be transmitted to the controller 180.

The information from the cross wind sensors 182 may then be utilized by the controller 180 to control the operation of, for example, the valve arrangement 184 for supplying pressurized gas to the actuator 160 associated with the windward deflector 102a or 102b when, for example, the combination 20 is experiencing the presence of a cross wind flow CF. For example, when cross wind flow CF contacts the weathervane 196, the head 198 substantially aligns itself in the direction of the cross wind flow CF, resulting in rotation of the shaft 200. The encoder 202 generates signals of such shaft rotation angle, either relative or absolute, and transmits these signals to the controller 180, which in turn, controls the operation of the valve arrangement 184. Operation of the valve arrangement supplies pressured gas to the appropriate pneumatic cylinder, thereby extending or retracting the linkage 164 in the appropriate manner.

In other embodiments, the controller 180 may utilize the information from the sensors to generate device specific controls for controlling the operation of other types of actuators, such as an electrical motor-powered jack screw. It will be appreciated that the controller 180 may be a separate controller dedicated to the control system 140, or may utilize an existing on-board controller, such as the engine control unit (ECU), that performs other functions in the operation of the tractor 22.

In an alternative embodiment, the control system 140 may omit the controller 180, and in its stead, the valve arrangement 184 may be mechanically controlled by a conventionally arranged rotary valve. The rotary valve can be configured to selectively connect the valve arrangement 184 with the source of pressurize gas 194. The rotary valve includes a shaft, which is integrally formed with or turned by the shaft 200 of the weathervane 196. In operation, when cross wind flow CF contacts the weathervane 196, the head 198 substantially aligns itself in the direction of the cross wind flow CF. As a result, the head 198 rotates the shaft 200 to operate the rotary valve, thereby operating the valve arrangement 184, which in turn, supplies pressured gas to the appropriate pneumatic cylinder, extending or retracting the linkage 164 in the appropriate manner.

For the purposes of this detailed description, the term "substantially" when referencing a reference direction, such as "substantially align," "substantially aligned," "substantially parallel," "substantially coplanar," "substantially perpendicular," etc. shall be defined as an orientation that varies less than 45 degrees from the indicated reference direction. For instance, the term "substantially parallel" indicates that the inclination of the item in question deviates less than 45 degrees from a parallel orientation. It should be noted that for purposes of this disclosure, terminology such as "upper," "lower," "vertical," "horizontal," "fore," "aft," "inner," "outer," etc., should be construed as descriptive and not limiting the scope of the present invention, as claimed.

While illustrative embodiments have been illustrated and described, it will be appreciated that various changes can be made therein without departing from the spirit and scope of the invention, as claimed.

The embodiments of the invention in which an exclusive property or privilege is claimed are defined as follows:

1. A side deflector assembly for selectively manipulating an aerodynamic drag of a vehicle having a lead body, a trailing body, and a gap formed therebetween, the side deflector assembly comprising:
    a first side deflector movable between a retracted position in which the first side deflector is substantially aligned with a first side of the vehicle, and an extended position in which the first side deflector extends outwardly from the first side of the vehicle at a selected angle;
    a second side deflector movable between a retracted position in which the second side deflector is substantially aligned with a second side of the vehicle, and an extended position in which the second deflector extends outwardly from the second side of the vehicle at a selected angle; and
    a control system associated with the first and second side deflectors and adapted to independently position the first and second side deflectors between the retracted position and the extended position, wherein the control system includes at least one cross wind sensor that senses the direction of a cross wind relative to the vehicle and a controller that selects a windward side deflector from the first and second side deflectors based on the sensed direction of the cross wind and articulates only the windward side deflector to the extended position.

2. The assembly of claim 1, wherein the control system further includes first and second actuators associated with the first and second side deflectors, the actuation of which causes the side deflectors to move between the retracted position and the extended position.

3. The assembly of claim 1, wherein the control system further includes means for moving the side deflectors between the retracted position and the extended position.

4. The assembly of claim 2, wherein actuation of the actuators occurs in response to one or more control signals transmitted from the controller.

5. The assembly of claim 1, wherein the side deflectors are movable from the retracted position to a braking position in which the side deflectors are at least partially disposed into the airstream passing along the side of the vehicle to increase a drag coefficient of the vehicle.

6. The assembly of claim 1, wherein the extended position of the windward side deflector is selected from a group consisting of a plurality of positions in which the windward side deflector extend outwardly from the windward side of the vehicle at a selected angle, the extended position being dependent on the directional value sensed by the cross flow sensor.

7. A side panel assembly for selectively manipulating an aerodynamic drag of a vehicle having a lead body, a trailing body, and a gap formed therebetween, the side panel assembly comprising:
    (a) first and second side deflectors movable between a retracted position in which the side deflectors are substantially aligned with the sides of the vehicle, at least one extended position in which the side deflectors extend outwardly from the side of the vehicle at a selected angle, and a braking position in which the side deflectors are at least partially disposed into the airstream passing along the side of the vehicle to increase a drag coefficient of the vehicle; and (b) a control system associated with the first and second side deflectors and adapted to selectively and independently position the first and second side deflectors between the retracted position, the at least one extended position, and the braking position, wherein the control system includes at least one cross wind sensor that senses the direction of a cross wind relative to the vehicle and a controller for effecting asymmetrical articulation of one of the first and second side deflectors to the at least one extended position with respect to the other one of the first and second side deflectors in response to the sensed crosswind.

8. The assembly of claim 7, wherein the controller moves the first and second side deflectors to the braking position upon receipt of a signal indicative of vehicle braking.

9. The assembly of claim 7, wherein the control system further includes first and second actuators associated with the first and second side deflectors, the actuation of which causes the side deflectors to move between the retracted position, the at least one extended position, and the braking position.

10. The assembly of claim 7, wherein the control system further includes means for moving the side deflectors between the retracted position, the at least one extended position, and the braking position.

11. A method for manipulating the aerodynamic drag on a vehicle in a cross wind condition, the vehicle having first and second side deflectors independently movable to a extended position, the method comprising the steps of:
sensing a cross wind condition; and in response to the sensed cross wind
deploying only one of the first and second side deflectors to the extended position, the extended side deflector being on the windward side of the vehicle.

12. The method of claim 11, wherein the extended position is a position in which the side deflectors extend outwardly from the side of the vehicle at a selected angle.

13. The method of claim 11, further comprising
sensing a braking condition of the vehicle; and
extending the first and second deflector to the extended position.

* * * * *